(12) United States Patent
Karuppiah et al.

(10) Patent No.: US 12,120,374 B2
(45) Date of Patent: Oct. 15, 2024

(54) DEVICE AND METHOD TO SWITCH TELEVISION OPERATION TO PRIMARY CONTENT MODE AFTER DISPLAYING AN IMPORTANT CONTENT ON SECONDARY INPUT MODE

(71) Applicant: ARRIS Enterprises LLC, Suwanee, GA (US)

(72) Inventors: Sadeesh Kumar Karuppiah, Bangalore (IN); Swaroop Mahadeva, Bangalore (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 254 days.

(21) Appl. No.: 17/887,728

(22) Filed: Aug. 15, 2022

(65) Prior Publication Data
US 2023/0097328 A1     Mar. 30, 2023

Related U.S. Application Data

(60) Provisional application No. 63/249,371, filed on Sep. 28, 2021.

(51) Int. Cl.
*H04N 21/422* (2011.01)
*H04N 21/472* (2011.01)
(Continued)

(52) U.S. Cl.
CPC ..... *H04N 21/42203* (2013.01); *H04N 21/472* (2013.01); *H04R 1/08* (2013.01); *H04R 3/00* (2013.01)

(58) Field of Classification Search
CPC ........... H04N 21/42203; H04N 21/472; H04N 21/47214; H04R 1/08; H04R 3/00; H04R 5/00; H04R 29/00
(Continued)

(56) References Cited

U.S. PATENT DOCUMENTS

2007/0136743 A1* 6/2007 Hasek ................. H04N 21/435
375/E7.025
2007/0204291 A1* 8/2007 Ichihashi ........... H04N 21/4432
725/35
(Continued)

FOREIGN PATENT DOCUMENTS

CN           111405143 A    *  7/2020
WO      WO-2015148693 A1   * 10/2015    ......... G06F 16/2358

OTHER PUBLICATIONS

International Search Report and the Written Opinion of the International Searching Authority dated Jan. 2, 2023 in International (PCT) Application No. PCT/US2022/040306.
(Continued)

*Primary Examiner* — John W Miller
*Assistant Examiner* — Omer Khalid
(74) *Attorney, Agent, or Firm* — Wenderoth, Lind & Ponack, L.L.P.

(57) ABSTRACT

A media device includes: a microphone for recording a television; a memory having the important content; and a processor to: instruct the microphone to record audio data while the television is operating in a primary mode and store in the memory; instruct the television to switch operation from the primary mode to an important content mode; provide the important content to the television; subsequently instruct the television to switch from the important content mode to the primary mode using a primary protocol; instruct the microphone to record subsequent audio data; determine whether the television switched from the important content mode to the primary mode based on the initial audio data and the subsequent audio data; and instruct the television to switch from the important content mode to the primary mode using a secondary protocol when it is determined that the television has not switched.

18 Claims, 7 Drawing Sheets

(51) Int. Cl.
*H04R 1/08* (2006.01)
*H04R 3/00* (2006.01)

(58) Field of Classification Search
USPC .......... 348/522; 725/33; 381/26, 58, 56, 95,
381/111, 122, 355
See application file for complete search history.

(56) References Cited

U.S. PATENT DOCUMENTS

| | | | |
|---|---|---|---|
| 2011/0285806 A1* | 11/2011 | Shirai | H04N 7/148 |
| | | | 348/14.01 |
| 2015/0033275 A1* | 1/2015 | Natani | H04N 21/42221 |
| | | | 725/110 |
| 2015/0350594 A1* | 12/2015 | Mate | H04N 21/23439 |
| | | | 348/445 |
| 2018/0103285 A1* | 4/2018 | Kim | H04N 21/42204 |
| 2018/0157398 A1* | 6/2018 | Kaehler | G06T 19/006 |

OTHER PUBLICATIONS

International Preliminary Report on Patentability issued Apr. 2, 2024, in International (PCT) Application No. PCT/US2022/040306.

\* cited by examiner

DEVICE AND METHOD TO SWITCH TELEVISION OPERATION TO PRIMARY CONTENT MODE AFTER DISPLAYING AN IMPORTANT CONTENT ON SECONDARY INPUT MODE

BACKGROUND

Embodiments of the present disclosure relate to switching inputs on a multi-input television.

SUMMARY

Aspects of the present disclosure are drawn to a media device for use with a television having a primary input and a media device input, the primary input being configured to receive primary content, the media device input being in connection with the media device and being configured to receive important content from the media device, the television being configured to operate in a primary mode so as to play the primary content as received by the primary input and to operate in an important content mode so as to play the important content as received by the media device input. The media device includes: a microphone configured to record initial sound from the television while operating in the first mode at an initial time, to generate initial audio data based on the recorded initial sound, to record subsequent sound from the television at a subsequent time, and to generate subsequent audio data based on the recorded subsequent sound; a memory having the important content and instructions stored therein; and a processor configured to execute the instructions stored in the memory to cause the media device to: instruct the microphone to record the initial sound; store the initial audio data into the memory; instruct the television to switch operation from the primary mode to the important content mode; provide the important content to the television; subsequently instruct the television to switch operation from the important content mode to the primary mode using a primary protocol; instruct the microphone to record the subsequent sound from the television at the subsequent time; determine whether the television switched operation from the important content mode to the primary mode based on the initial audio data and the subsequent audio data; and automatically instruct the television to switch operation from the important content mode to the primary mode using a secondary protocol when it is determined that the television has not switched operation from the important content mode to the primary mode.

In some embodiments, the processor is configured to execute instructions stored on the memory to additionally cause the media device to subsequently instruct the television to switch operation from the important content mode to the primary mode using a High-Definition Multimedia Interface Consumer Electronics Control (HDMI CEC) protocol having a primary control code as the primary protocol.

In some embodiments, the processor is further configured to execute instructions stored on the memory to additionally cause the media device to automatically instruct the television to switch operation from the important content mode to the primary mode using a HDMI CEC protocol having a secondary control code as the secondary protocol when it is determined that the television has not switched operation from the important content mode to the primary mode.

In some embodiments, the processor is further configured to execute instructions stored on the memory to additionally cause the media device to determine whether the television switched operation from the important content mode to the primary mode based on a comparison of the volume of the initial audio data and volume of the subsequent audio data.

In some embodiments, the media device is for further use with a remote control device configured to remotely instruct, by way of a first remote instruction signal, the television to switch operation from the important content mode to the primary mode using the secondary protocol. In these embodiments the media device further includes: a wireless transmitter configured to transmit a wireless signal to the remote control device, wherein the processor is configured to execute instructions stored on the memory to additionally cause the media device to automatically instruct the television to switch operation from the important content mode to the primary mode using a secondary protocol by instructing the remote control device, via the wireless signal of the wireless transmitter, to transmit the first remote instruction signal when it is determined that the television has not switched operation from the important content mode to the primary mode. In some of these embodiments, the media device is for further use with the remote control device being additionally configured to remotely instruct, by way of a second remote instruction signal, the television to switch operation from the primary mode to the important content mode, and being additionally configured to remotely instruct, by way of a third remote instruction signal, the television to switch operation from the important content mode to the primary mode using the primary protocol, wherein the processor is further configured to execute instructions stored on the memory to additionally cause the media device to instruct the television to switch operation from the primary mode to the important content mode by instructing the remote control device, via a second wireless signal of the wireless transmitter, to transmit the second remote instruction signal; and subsequently instruct the television to switch operation from the important content mode to the primary mode using by instructing the remote control device, via a third wireless signal of the wireless transmitter, to transmit the third remote instruction signal.

Other aspects of the present disclosure are drawn to a method of using a media device with a television having a primary input and a media device input, the primary input being configured to receive primary content, the media device input being in connection with the media device and being configured to receive important content from the media device, the television being configured to operate in a primary mode so as to play the primary content as received by the primary input and to operate in an important content mode so as to play the important content as received by the media device input. The method includes: instructing, via a processor configured to execute instructions stored on a memory, a microphone to record an initial sound from the television while operating in the first mode at an initial time to generate initial audio data based on the recorded initial sound; storing, via the processor, the initial audio data into the memory; instructing, via the processor, the television to switch operation from the primary mode to the important content mode; providing, via the processor, the important content to the television; subsequently instructing, via the processor, the television to switch operation from the important content mode to the primary mode using a primary protocol; instructing, via the processor, the microphone to record a subsequent sound from the television at a subsequent time to generate subsequent audio data based on the recorded subsequent sound; determining, via the processor, whether the television switched operation from the important content mode to the primary mode based on the initial audio data and the subsequent audio data; and automatically instructing, via the processor, the television to switch operation from the important content mode to the primary mode using a secondary protocol when it is determined that the television has not switched operation from the important content mode to the primary mode.

In some embodiments, the subsequently instructing the television to switch operation from the important content mode to the primary mode includes subsequently instructing the television to switch operation from the important content mode to the primary mode using a HDMI CEC protocol having a primary control code as the primary protocol.

In some embodiments, the automatically instructing the television to switch operation from the important content mode to the primary mode using a secondary protocol when it is determined that the television has not switched operation from the important content mode to the primary mode includes automatically instructing the television to switch operation from the important content mode to the primary mode using a HDMI CEC protocol having a secondary control code as the secondary protocol when it is determined that the television has not switched operation from the important content mode to the primary mode.

In some embodiments, the determining, via the processor, whether the television switched operation from the important content mode to the primary mode based on the initial audio data and the subsequent audio data includes determining whether the television switched operation from the important content mode to the primary mode based on a comparison of the volume of the initial audio data and volume of the subsequent audio data.

In some embodiments, the method is for further use with a remote control device configured to remotely instruct, by way of a first remote instruction signal, the television to switch operation from the important content mode to the primary mode using the secondary protocol, wherein the method further includes automatically instructing the television to switch operation from the important content mode to the primary mode using a secondary protocol by instructing the remote control device, via a wireless signal of a wireless transmitter configured to transmit a wireless signal, to transmit the first remote instruction signal when it is determined that the television has not switched operation from the important content mode to the primary mode. In some of these embodiments, the method is for further use with the remote control device being additionally configured to remotely instruct, by way of a second remote instruction signal, the television to switch operation from the primary mode to the important content mode, and being additionally configured to remotely instruct, by way of a third remote instruction signal, the television to switch operation from the important content mode to the primary mode using the primary protocol, wherein the method further includes instructing, via a second wireless signal of the wireless transmitter, the television to switch operation from the primary mode to the important content mode by instructing the remote control device to transmit the second remote instruction signal; and subsequently instructing, via a third wireless signal of the wireless transmitter, the television to switch operation from the important content mode to the primary mode by instructing the remote control device to transmit the third remote instruction signal.

Other aspects of the present disclosure are drawn to a non-transitory, computer-readable media having computer-readable instructions stored thereon, the computer-readable instructions being capable of being read by a media device for use with a television having a primary input and a media device input, the primary input being configured to receive primary content, the media device input being in connection with the media device and being configured to receive important content from the media device, the television being configured to operate in a primary mode so as to play the primary content as received by the primary input and to operate in an important content mode so as to play the important content as received by the media device input, wherein the computer-readable instructions are capable of instructing the media device to perform the method including: instructing, via a processor configured to execute instructions stored on a memory, a microphone to record an initial sound from the television while operating in the first mode at an initial time to generate initial audio data based on the recorded initial sound; storing, via the processor, the initial audio data into the memory; instructing, via the processor, the television to switch operation from the primary mode to the important content mode; providing, via the processor, the important content to the television; subsequently instructing, via the processor, the television to switch operation from the important content mode to the primary mode using a primary protocol; instructing, via the processor, the microphone to record a subsequent sound from the television at a subsequent time to generate subsequent audio data based on the recorded subsequent sound; determining, via the processor, whether the television switched operation from the important content mode to the primary mode based on the initial audio data and the subsequent audio data; and automatically instructing, via the processor, the television to switch operation from the important content mode to the primary mode using a secondary protocol when it is determined that the television has not switched operation from the important content mode to the primary mode.

In some embodiments, the computer-readable instructions are capable of instructing the media device to perform the method wherein the subsequently instructing the television to switch operation from the important content mode to the primary mode includes subsequently instructing the television to switch operation from the important content mode to the primary mode using a HDMI CEC protocol having a primary control code as the primary protocol.

In some embodiments, the computer-readable instructions are capable of instructing the media device to perform the method wherein the automatically instructing the television to switch operation from the important content mode to the primary mode using a secondary protocol when it is determined that the television has not switched operation from the important content mode to the primary mode includes automatically instructing the television to switch operation from the important content mode to the primary mode using a HDMI CEC protocol having a secondary control code as the secondary protocol when it is determined that the television has not switched operation from the important content mode to the primary mode.

In some embodiments, the computer-readable instructions are capable of instructing the media device to perform the method wherein the determining, via the processor, whether the television switched operation from the important content mode to the primary mode based on the initial audio data and the subsequent audio data includes determining whether the television switched operation from the important content mode to the primary mode based on a comparison of the volume of the initial audio data and volume of the subsequent audio data.

In some embodiments, the non-transitory, computer-readable media is for further use with a remote control device configured to remotely instruct, by way of a first remote instruction signal, the television to switch operation from the important content mode to the primary mode using the secondary protocol, wherein the computer-readable instructions are capable of instructing the media device to perform the method further including automatically instructing the television to switch operation from the important content mode to the primary mode using a secondary protocol by instructing the remote control device, via a wireless signal of a wireless transmitter configured to transmit a wireless signal, to transmit the first remote instruction signal when it is determined that the television has not switched operation from the important content mode to the primary mode. In some of these embodiments, the non-transitory, computer-readable media is for further use with the remote control device being additionally configured to remotely instruct, by way of a second remote instruction signal, the television to switch operation from the primary mode to the important content mode, and being additionally configured to remotely instruct, by way of a third remote instruction signal, the television to switch operation from the important content mode to the primary mode using the primary protocol, wherein the computer-readable instructions are capable of instructing the media device to perform the method further including instructing, via a second wireless signal of the wireless transmitter, the television to switch operation from the primary mode to the important content mode by instructing the remote control device to transmit the second remote instruction signal; and subsequently instructing, via a third wireless signal of the wireless transmitter, the television to switch operation from the important content mode to the primary mode by instructing the remote control device to transmit the third remote instruction signal.

BRIEF SUMMARY OF THE DRAWINGS

The accompanying drawings, which are incorporated in and form a part of the specification, illustrate example embodiments and, together with the description, serve to explain the principles of the present disclosure. In the drawings.

DETAILED DESCRIPTION

With today's technology, practically everything can be attached to the television while people daily activities are involved with watching/streaming media contents on their televisions. Since the television has become a central device for displaying information and media contents, a new technology has emerged and provided certain media devices the ability to identify important information and contents that are available to the users, able to interrupt the television operation to switch from a primary content mode to a secondary content mode and display the important contents to the users. A prior art multi-inputs television setup will now be discussed with reference to FIG. 1.

Figure 1:
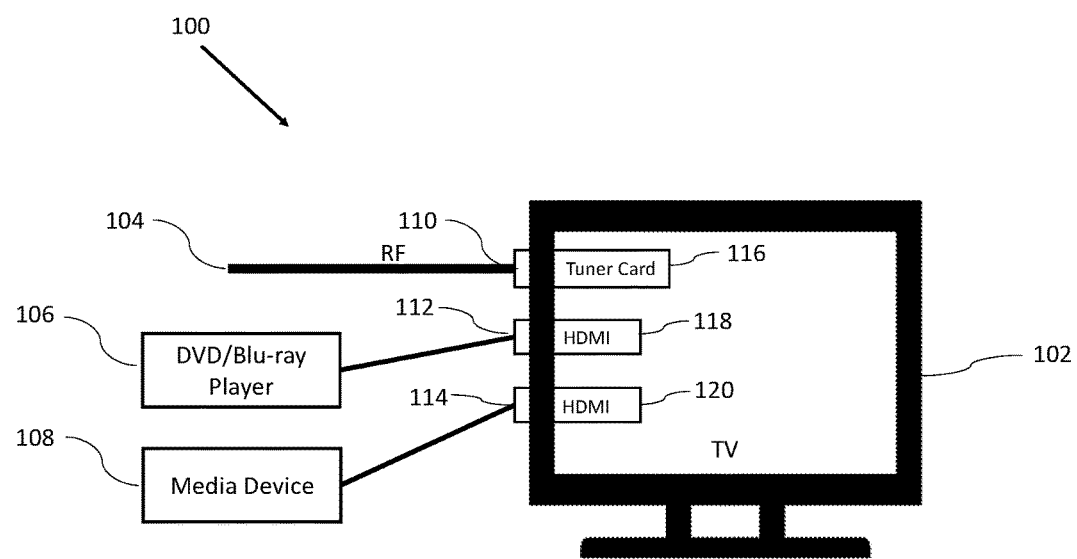
FIG. 1 illustrates a prior art of a standard television setup with multiple media inputs.

FIG. 1 illustrates a prior art of a standard television setup with multiple media inputs.

As shown in FIG. 1, television setup 100 contains a TV 102, that an RF coax 104, a DVD/Blu-ray player 106 and a media device 108. TV 102 includes an RF input 110, an HDMI input 112, an HDMI input 114, a tuner card 116, an HDMI input connection 118, and an HDMI input connection 120.

RF coax 104 is arranged to connect to tuner card 116 at RF input 110. RF coax 104 provides cable/satellite/antenna video content to TV 102. TV 102 is able to play video content from RF coax 104, when TV 102 is configured to RF input 110.

DVD/Blu-ray player 106 is arranged to connect to HDMI input connection 118 at HDMI input 112. DVD/Blu-ray player 106 provides video content to TV 102. TV 102 is able to play video content from DVD/Blu-ray player 106, when TV 102 is configured to HDMI input 112.

Media device 108 is arranged to connect to HDMI input connection 120 at HDMI input 114. Media device 108 provides important content to TV 102. TV 102 is able to play important content from media device 108, when TV 102 is configured to HDMI input 114.

In operation, typically the user may watch content from cable/satellite/antenna, i.e., having TV 102 configured to RF input 110, or from DVD/Blu-ray player 106, i.e., having TV 102 configured to HDMI input 112. For purposes of discussion, either one of these content sources will be considered primary content. For purposes of brevity only, within this disclosure, consider situations wherein the user may watch content from cable/satellite/antenna, i.e., having TV 102 configured to RF input 110. As such, having TV 102 configured to RF input 110 will be described as TV 102 operating, or being, in a primary content mode.

On the other hand, when TV 102 is configured to HDMI input 114, so as to receive important content from media device 108, TV 102 will be described as operating, or being, in an important content mode.

In operation, as the user is watching TV 102 in the primary content mode using RF 104, media device 108 detects an important content is available for the user. The important content may be identified as any content that may be important to the user, non-limiting examples of which include an upcoming doctor appointment, an important public announcement, an important phone call, etc.

Media device 108 will interrupt the television operation mode and instruct TV 102 to be configured to HDMI input 114, so as to operate in the important content mode to receive important content from media device 108. Once the important content is finished, media device 108 is supposed to instruct TV 102 to be configured to RF input 110, to return to the primary content mode. However, occasionally the television fails to switch operation back to the primary content mode. When this issue occurs, the user is forced to manually switch the television operation back to the primary content mode.

What is needed is a device and method for properly switching the television operation back to primary content mode after finish displaying an important content in an important content mode.

A device and method in accordance with the present disclosure to switch the television operation back to primary content mode after finishing displaying an important content on an important content mode.

In accordance with the present disclosure, a media device is used to receive all incoming important contents and is connected to one of the television's inputs. The media device is able to obtain important content and control the television operation to switch the television input from primary content mode to the important content mode so as to play the important content.

Once the important content is available, the media device will record and save the audio output of the television as the television is playing in primary content mode. Then, the media device will instruct the television to switch from the primary content mode to the important content mode so as to play the important content. Once the important content is finished, the media device will instruct the television to switch back to the primary content mode. The media device will record the output audio once again and compare to the one previously recorded. If the output audio does not correspond to the one previously recorded, the media device recognizes that the switching process was not successfully completed. As such, the media device will send another set of instructions to switch the television operation back to the primary content mode.

An example device and method for properly switching the television operation back to primary content mode after displaying an important content on an important content mode in accordance with aspects of the present disclosure will now be described in greater detail with reference to FIGS. 2-4.

Figure 2:
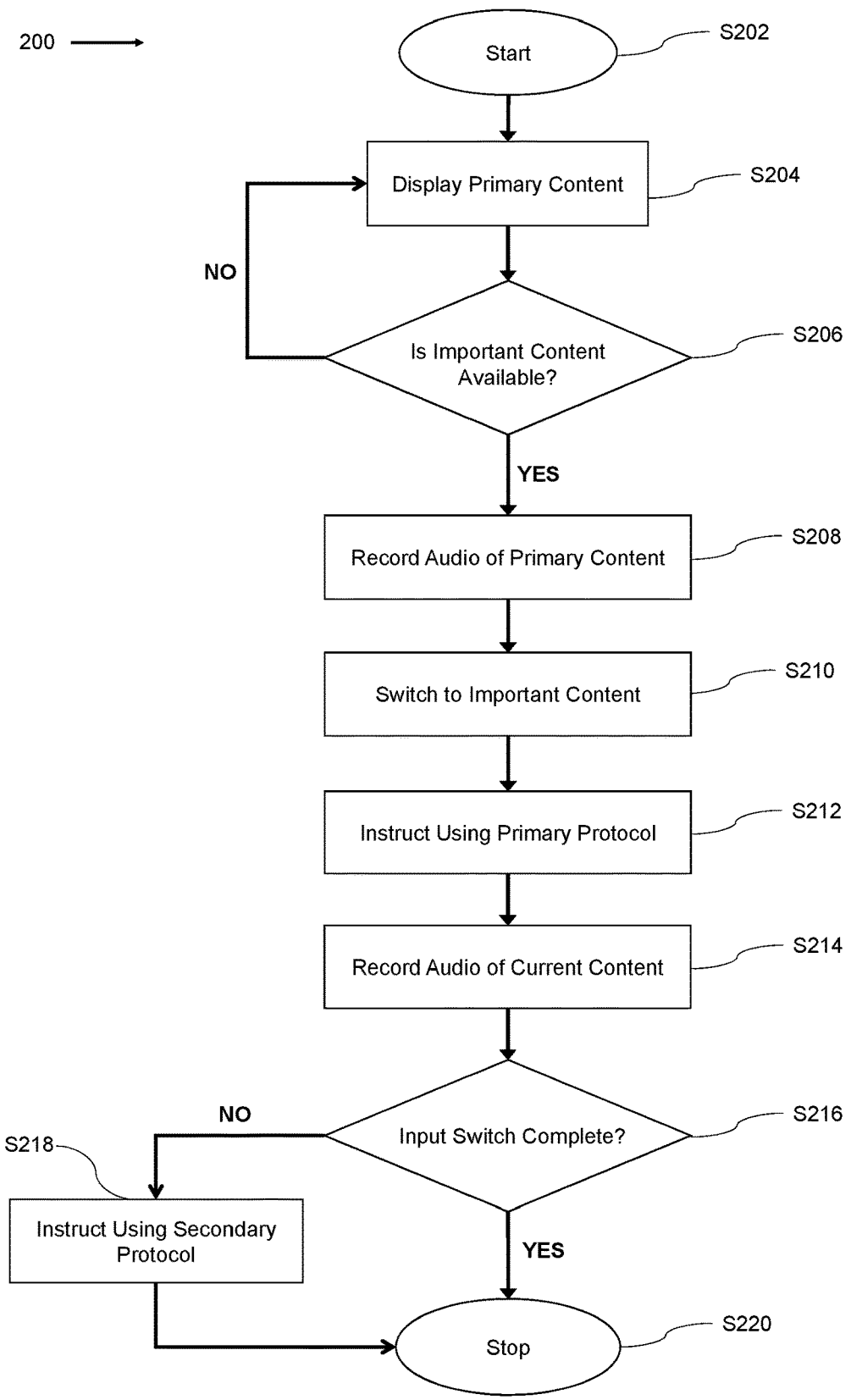
FIG. 2 illustrates a method of switching the television to primary content mode after displaying an important content in accordance with aspects of the present disclosure.

FIG. 2 illustrates an algorithm 200 to be executed by a processor for switching the television operation to primary content mode after displaying an important content during an important content mode in accordance with aspects of the present disclosure.

As shown in the figure, algorithm 200 starts (S202) and the television is currently playing primary content. This will now be discussed in greater detail with reference to FIG. 3.

Figure 3:
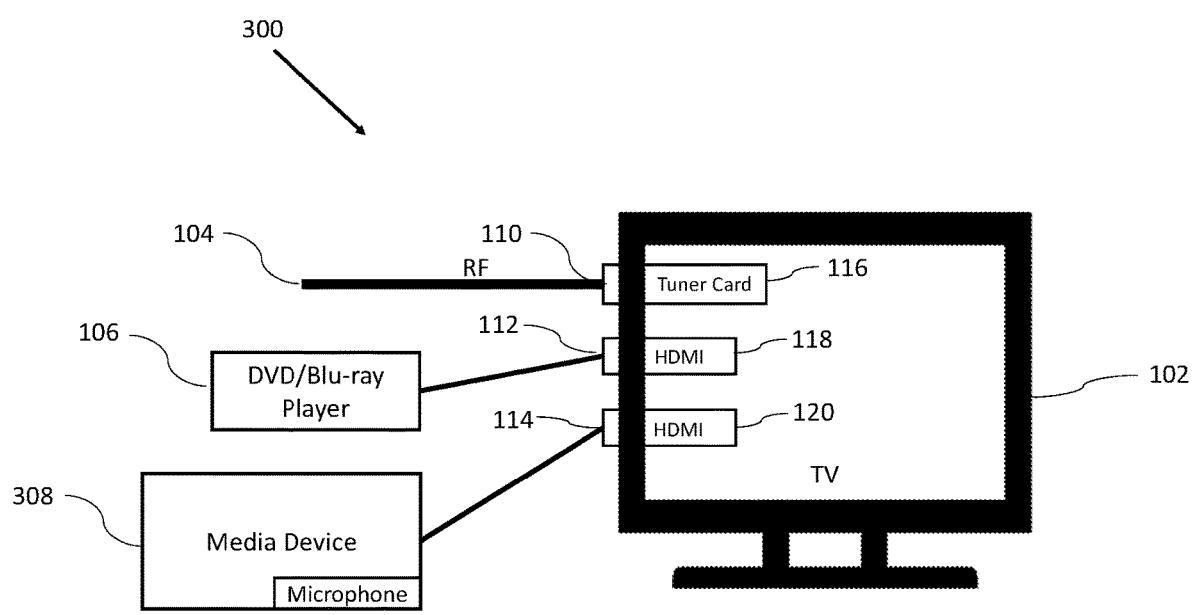
FIG. 3 illustrates the television setup with multiple inputs in accordance with aspects of the present disclosure.

FIG. 3 illustrates a television setup with multiple inputs in accordance with aspects of the present disclosure.

As shown in FIG. 3, television setup 300 differs from television setup 100 discussed above with reference to FIG. 1 in that media device 100 has been replaced with a media device 308 in television setup 300.

In operation, TV 102 is currently playing primary content on RF 104 as the primary mode.

Returning to FIG. 2, while the television is playing the primary content, media device 308 monitors if any important content is available (S206). In some embodiments, media device 308 has important content stored therein. In some embodiments, media device 308 received important content from an external source. These embodiments will now be described in greater detail with reference to FIG. 4.

Figure 4:
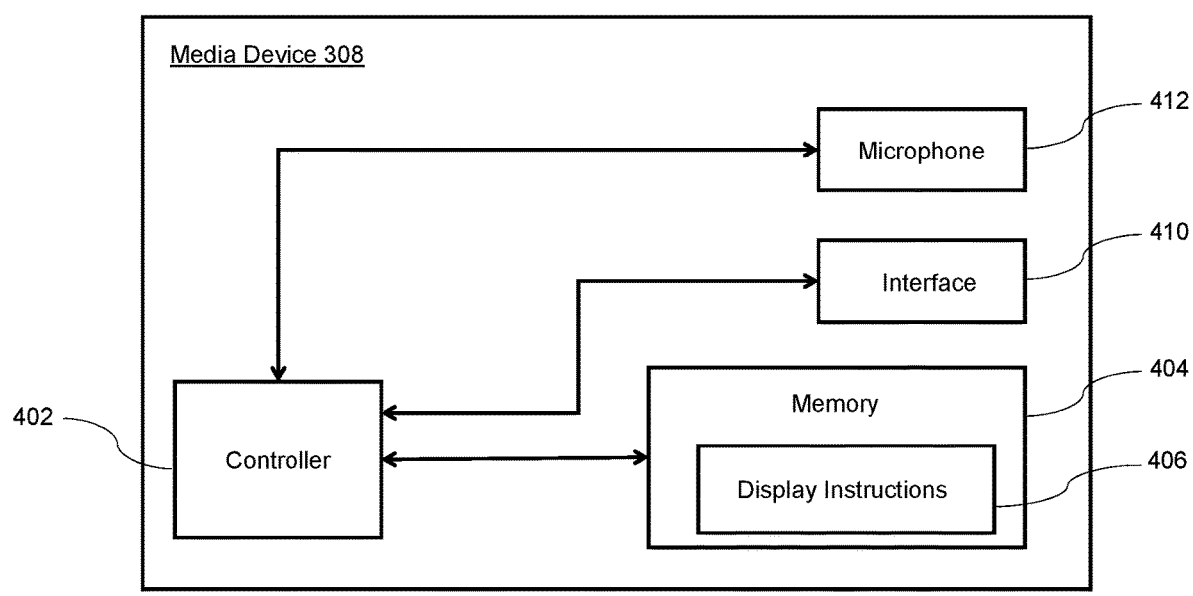
FIG. 4 illustrates an exploded view of the media device in accordance with aspects of the present disclosure.

FIG. 4 illustrates an exploded view of a media device in accordance with aspects of the present disclosure.

In this figure, media device 308 includes a controller 402; a memory 404, which has stored therein a set of display instructions 406; an interface 410, and a microphone 412.

In this example, controller 402, memory 404, interface 406 and microphone 408 are illustrated as individual devices. However, in some embodiments, at least two of controller 402, memory 404, interface 406 and microphone 408 may be combined as a unitary device. Further, in some embodiments, at least one of controller 402 and memory 404 may be implemented as a computer having tangible computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to controller 402 such that controller 402 may read information from, and write information to, the tangible computer-readable media. In the alternative, the tangible computer-readable media may be integral to controller 402. Controller 402 and the tangible computer-readable media may reside in an integrated circuit (IC), an ASIC, or large scale integrated circuit (LSI), system LSI, super LSI, or ultra LSI components that perform a part or all of the functions described herein. In the alternative, controller 402 and the tangible computer-readable media may reside as discrete components.

Example tangible computer-readable media may be also be coupled to systems, non-limiting examples of which include a computer system/server, which is operational with numerous other general-purpose or special-purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Controller 402 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of media device 308 in accordance with the embodiments described in the present disclosure.

Memory 404 can store important contents, recorded audio data, and include, but are not limited to, random-access memories (RAM), dynamic random-access memories (DRAM), hard drives, solid-state drives, read-only memories (ROM), erasable programmable read-only memories (EPROM), electrically erasable programmable read-only memories (EEPROM), flash memories, embedded memories blocks in FPGAs, or any other various layers of memory hierarchy.

Memory 404, as will be described in greater detail below, also has stored therein, display instructions 406 that when executed by controller 402, media device 308 to: instruct microphone 408 to record audio data; store the recorded audio data into memory 404; send instructions for TV 102 to switch operation from primary mode to the important content mode; provide the important content to TV 102; subsequently instruct TV 102 to switch operation from the important content mode to the primary mode using a primary protocol; instruct microphone 408 to record the subsequent sound from TV 102 at the subsequent time; determine whether TV 102 switched operation from the important content mode to the primary mode based on the initial audio data and the subsequent audio data; and automatically instruct TV 102 to switch operation from the important content mode to the primary mode using a secondary protocol when it is determined that TV 102 has not switched operation from the important content mode to the primary mode.

In some embodiments, as will described in greater detail below, the display instructions 406, when executed by controller 402, additionally cause media device 308 to subsequently instruct TV 102 to switch operation from the important content mode to the primary mode using a HDMI CEC protocol having a primary control code as the primary protocol. In some of these embodiments, as will described in greater detail below, the display instructions 406, when executed by controller 402, additionally cause media device 308 to automatically instruct TV 102 to switch operation from the important content mode to the primary mode using a HDMI CEC protocol having a secondary control code as the secondary protocol when it is determined that TV 102 has not switched operation from the important content mode to the primary mode.

In some embodiments, as will described in greater detail below, the display instructions 406, when executed by controller 402, additionally cause media device 308 to determine whether TV 102 switched operation from the important content mode to the primary mode based on a comparison of the volume of the initial audio data and volume of the subsequent audio data.

Interface 406 can include one or more connectors, such as RF connectors, or Ethernet connectors, and/or wireless communication circuitry, such as 5G and Bluetooth low energy (BLE) circuitry and one or more antennas.

Microphone 408 is used to record from the television and generate audio data based on the recorded sound.

With respect to important content, in some embodiments memory 404 may have important content stored therein. In these embodiments, controller 402 may execute instructions in display instructions 406 to cause controller 402 to obtain the important content from memory 404. Non-limiting examples of such important content may be reminders, tied to a date and/or time, such as a reminder for the user to take medicine or a reminder for the user to go to the doctor.

Further, in some embodiments, interface 410 may receive real time important content from an external source. In these embodiments, controller 402 may execute instructions in display instructions 406 to cause controller 402 to obtain the important content from interface 410. Non-limiting examples of such important content may be phone calls or emergency broadcast warnings.

If there is no important content available (No on S206), then TV 102 continues to operate in the primary content mode so as to continue playing primary content (S204). However, if there is an important content available (Yes on S206), then media device 308 will start recording the audio of the primary content (S208). For example, while the user is watching TV 102, media device 308 may receive a severe weather announcement from an emergency broadcast system. Media device 308 starts recording the audio of the primary content. This will now be discussed in greater detail with reference to FIG. 4.

FIG. 4 illustrates an exploded view of a media device in accordance with aspects of the present disclosure.

In operation, controller 402 executes instructions within display instructions 408 to cause microphone 412 to record initial sound from TV 102. Here, the term "initial" is merely used as a descriptor of the sound that is recorded prior to playing the important content. Microphone 412 records the initial sound from TV 102. In some embodiments, microphone 412 records the initial sound from TV 102 for a predetermined period of time, a non-limiting example of which includes 3 seconds.

Microphone 412 then generates initial audio data based on the recorded initial sound. In some embodiments, the initial audio data is an encoded data file of the actual recorded initial sound during the entire predetermined period of time, e.g., a way file or mp3 file. In some embodiments, the initial audio data is an encoded data file of merely the volume of the actual recorded initial sound during the entire predetermined period of time. In some embodiments, the initial audio data is an encoded data file of merely the average volume of the actual recorded initial sound during the entire predetermined period of time. In some embodiments, the initial audio data is an encoded data file of a signature of the actual recorded initial sound during the entire predetermined period of time, wherein the signature may be derived by detecting a predetermined number of parameters of the actual recorded initial sound during the entire predetermined period of time and then performing processing of the detected parameters, wherein the processing may include averaging, adding, subtracting, transforming, combinations thereof.

Controller 402 then executes additional instructions within display instructions 406 to cause controller 402 to obtain the initial audio data from microphone 412 and store the initial audio data into memory 404.

Returning to FIG. 2, after the audio data is recorded (S208), the media device acquires the television to switch to display important content mode (S210). For example, refer to FIG. 3, after media device 308 has recorded audio data using its microphone, it will instruct TV 102 to the important content mode to display the severe weather announcement. This process may be performed by known methods, a non-limiting example of which includes using an HDMI Consumer Electronics Control (CEC) protocol having a primary control code to instruct TV 102 to switch to the important content mode, which in this instance is HDMI input 112.

TV 102 will interrupt the primary content mode and switchover to display the severe weather announcement as received at HDMI input 112.

Returning to FIG. 2, once the important content is finished (S210), the media device instructs the television to switch back to primary content mode using the primary protocol (S212). For example, referring to FIG. 3, once TV 102 finishes displaying the severe weather announcement, media device 308 will instruct TV 102 to switch operation back to the primary content mode using a primary protocol. This process may be performed by known methods, a non-limiting example of which includes using an HDMI Consumer Electronics Control (CEC) protocol having a primary control code to instruct TV 102 to switch to back to the primary mode, which in this instance is RF input 110.

Returning to FIG. 2, after sending the instructions for the television to switch back to primary mode (S212), the media device will record the audio data of the current content displaying on the television (S214). For example, referring to FIG. 3, shortly after sending the instructions to switch TV 102 back to primary content mode, media device 308 will start recording the audio data of the current content displaying on TV 102.

In operation, controller 402 executes instructions within display instructions 408 to cause microphone 412 to record subsequent sound from TV 102. Here, the term "subsequent" is merely used as a descriptor of the sound that is recorded after the playing of the important content. Microphone 412 records the subsequent sound from TV 102. In some embodiments, microphone 412 records the subsequent sound from TV 102 in a manner similar to which the initial sound was recorded.

Microphone 412 then generates subsequent audio data based on the recorded subsequent sound in a manner similar to which the initial audio data was generated.

Controller 402 then executes additional instructions within display instructions 406 to cause controller 402 to obtain the subsequent audio data from microphone 412 and store the subsequent audio data into memory 404.

Returning to FIG. 2, after the subsequent audio data has been recorded (S214), the media device will compare the subsequent recorded audio data to the initial audio data previously recorded while the television was in primary content mode. The audio data comparison will be used to determine if the input switch is completed successfully (S216).

If the audio data comparison finds that the initial audio data corresponds with the subsequent audio data (Yes at S216), then the switch over to the primary media content has successfully completed and algorithm 200 stops (S220). For example, as shown in FIG. 3, controller 402 executes instructions in display instructions 406 so as to cause controller 402 to compare the subsequent audio data that was generated after TV 102 has switched back to primary content mode to the previously recorded initial audio data to determine whether TV 102 has successfully switched back to the primary content mode.

In some embodiments, controller 402 may determine whether TV 102 has successfully switched back to the primary content mode when initial audio data and the subsequent audio data are the same. For example, in the case wherein the initial audio data and the subsequent audio data are each based on an average volume level over the entire predetermined respective recording period, controller 402 may determine whether TV 102 has successfully switched back to the primary content mode when the average volume of the initial audio data and the average volume of the subsequent audio data are the same.

In some embodiments, controller 402 may determine whether TV 102 has successfully switched back to the primary content mode when initial audio data and the subsequent audio data are sufficiently similar. For example, in the case wherein the initial audio data and the subsequent audio data are each based on an average volume level over the entire predetermined respective recording period, controller 402 may determine whether TV 102 has successfully switched back to the primary content mode when the average volume of the initial audio data and the average volume of the subsequent audio data are within a predetermined volume difference threshold.

In some embodiments, controller 402 may determine whether TV 102 has successfully switched back to the primary content mode when the initial audio data and the subsequent audio data cross-correlated with one another within a predetermined cross-correlation coefficient. For example, in the case wherein the initial audio data is an encoded data file of an initial signature of the actual recorded initial sound during the entire initial predetermined period of time and the subsequent audio data is an encoded data file of a subsequent signature of the actual recorded subsequent sound during the entire subsequent predetermined period of time, controller 402 may determine whether TV 102 has successfully switched back to the primary content mode when a cross-correlation of the initial signature and the subsequent signature fall within a predetermined cross-correlation coefficient.

Returning to FIG. 2, if the audio data comparison finds that the audio data are not similar (No at S216), then the switch over to the primary media content is not successfully completed. The media device will, then, send another set of instructions for the switchover using the secondary protocol (S218). For example, refer to FIG. 3 after comparing the audio data files and finds that the audio data are not similar (based on the volume level), media device 308 will send a second set of instructions to TV 102 to request for a switch over to the primary media content using a secondary protocol.

In some embodiments, the secondary protocol is wholly different from the primary protocol. For example, if the primary protocol is an HDMI CEC protocol, the secondary protocol may be a TR-069 protocol. Further, as will be described in more detail below, wireless commands may be transmitted to a remote control unit that will control TV 102.

In some embodiments, the secondary protocol is different from the primary protocol. For example, if the primary protocol is an HDMI CEC protocol using a first control code, the secondary protocol may be another HDMI CED protocol using a second control code.

In some embodiments, the secondary protocol can be an infrared (IR) blaster configured to transmit an IR signal to the television to force the television operation to switch back to the primary content mode.

Returning to FIG. 2, after using the secondary protocol to send a second set of instructions for the television to switch back to primary mode (S218), algorithm 200 stops (S220).

In the non-limiting example embodiments discussed above with reference to FIGS. 3-4, the media device instructs the television to switch back and forth between modes of operation by way of a HDMI input. However, in other embodiments, a media device may instruct the television to switch back and forth between modes of operation by known wireless communication protocols. Further, in other embodiments, a media device may instruct the television to switch back and forth between modes of operation by way of a remote control device. This will be described in greater detail below with reference to FIGS. 5A-C.

Figure 5A:
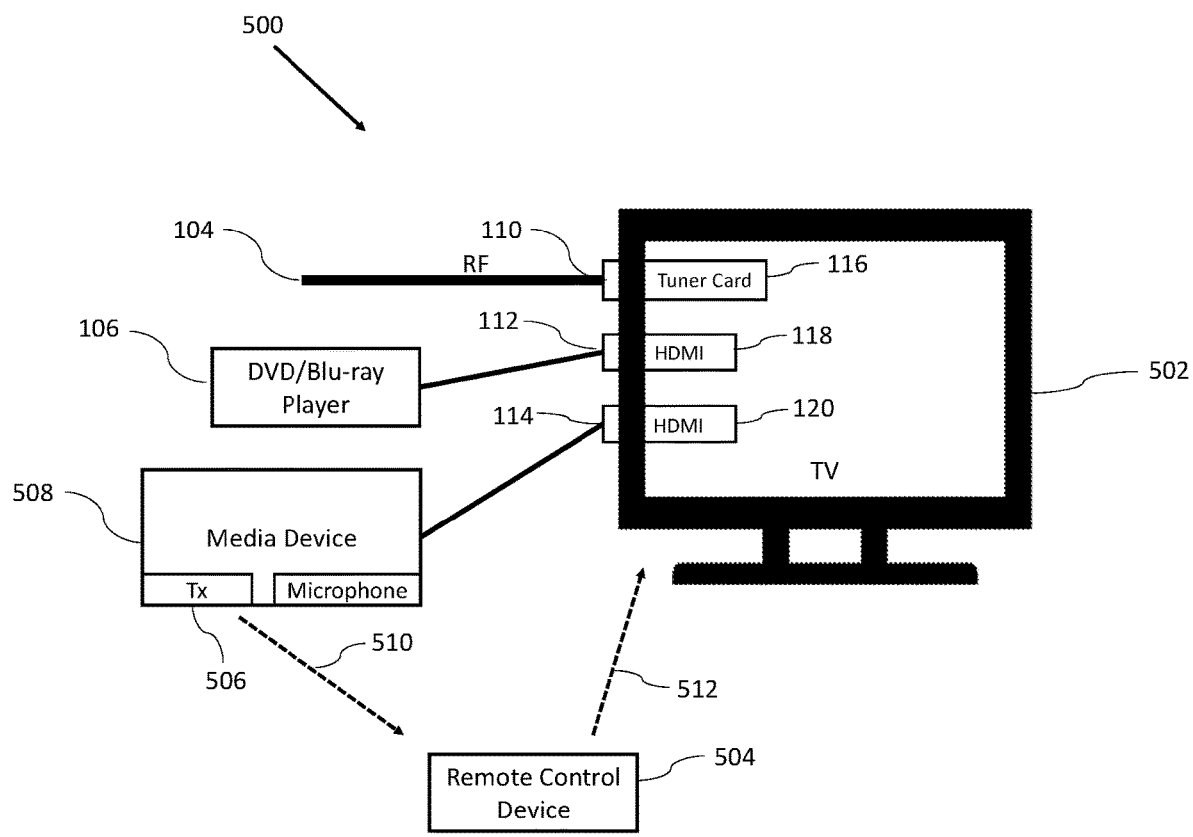
FIG. 5A illustrates another television setup with multiple inputs at a time to, in accordance with aspects of the present disclosure.

FIG. 5A illustrates another television setup with multiple inputs at a time to, in accordance with aspects of the present disclosure.

As shown in the figure, television setup 500 differs from television setup 300 discussed above with reference to FIG. 3 in that television setup 500 further includes a remote control device 504, TV 302 has been replaced with a TV 502, and media device 308 has been replaced with a media device 508.

Media device 508 includes all the elements of media device 308 and additionally includes a wireless transmitter 506.

Wireless transmitter 506 may include a wireless interface radio transceiver that is operable to communicate with remote control device 504 and also may include a cellular transceiver operable to communicate with cellular network 230. Wireless transmitter 506 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Wireless transmitter 506 may also include circuits to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 60 GHz bands, RF4CE protocol, ZigBee protocol, Z-Wave protocol, or IEEE 802.15.4 protocol.

TV 502 differs from TV 302 in that TV 502 is configured to be controlled by remote control device 504.

Remote control device 504 includes a wireless transmitter (not shown) similar to wireless transmitter 506, so as to communicate with media device 508. Further, remote control device 504 includes a transmitter configured to transmit remote instructions signals to TV 502 to control TV 502. In particular, in some embodiments, the transmitter of remote control device 504 may be configured to: remotely instruct, by way of a remote instruction signal, TV 502 to switch operation from the primary mode to the important content mode, for example as described above (see S210); remotely instruct, by way of a remote instruction signal, TV 502 to switch operation from the important content mode to the primary mode using the primary protocol, for example as described above (see S212); and to remotely instruct, by way of a remote instruction signal, TV 502 to switch operation from the important content mode to the primary mode using the secondary protocol, for example as described above (See S218).

In operation, a processor in media device 508 may perform algorithm 200 discussed above with reference to FIG. 2. However, when instructing TV 502 to switch to the important content (S210), media device 508 may transmit a wireless signal 510 to instruct remote control device 504 to instruct TV 502 to switch operation from the primary mode to the important content mode. In response to receiving wireless signal 510, remote control device 504 may then wirelessly transmit a remote instruction signal 512 to TV 502 to instruct TV 520 to switch operation from the primary mode to the important content mode.

Figure 5B:
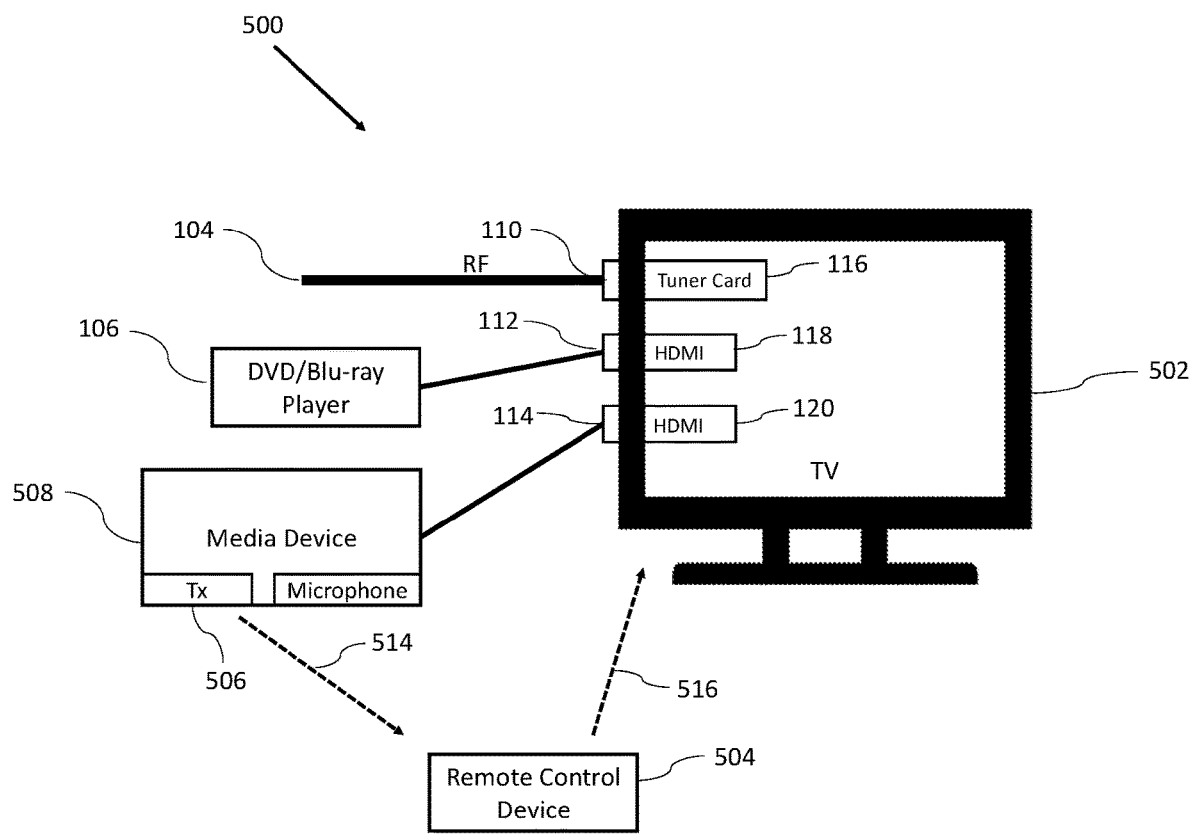
FIG. 5B illustrates the television setup of FIG. 5A at a time $t_1$.

FIG. 5B illustrates television setup 500 at a time $t_1$.

In operation, when instructing TV 502 to switch back to the primary content (S212), media device 508 may transmit a wireless signal 514 to instruct remote control device 504 to instruct TV 502 to switch operation from the important content mode back to the primary mode. In response to receiving wireless signal 514, remote control device 504 may then wirelessly transmit a remote instruction signal 516 to TV 502 to instruct TV 520 to switch operation from the important content mode back to the primary mode, using a primary protocol.

Figure 5C:
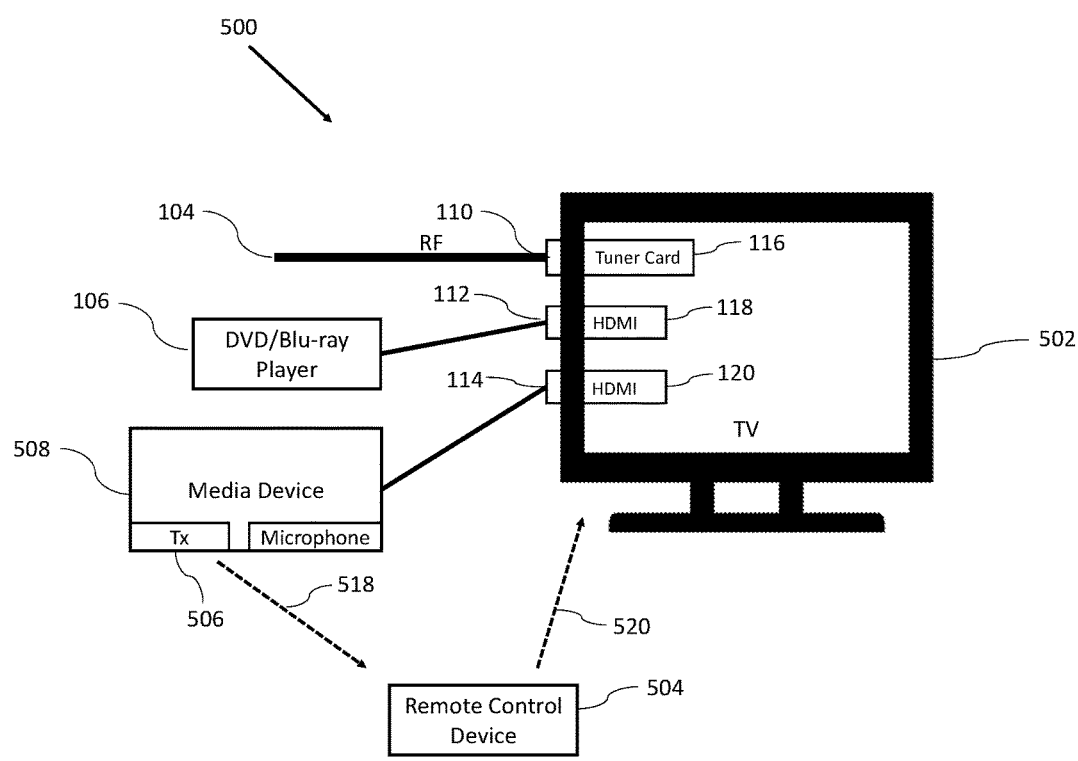
FIG. 5C illustrates the television setup of FIG. 5A at a time $t_2$.

FIG. 5C illustrates television setup 500 at a time $t_2$.

In operation, when instructing TV 502 to switch back to the primary content (S218), media device 508 may transmit a wireless signal 518 to instruct remote control device 504 to instruct TV 502 to switch operation from the important content mode back to the primary mode. In response to receiving wireless signal 518, remote control device 504 may then wirelessly transmit a remote instruction signal 520 to TV 502 to instruct TV 520 to switch operation from the important content mode back to the primary mode using a secondary protocol.

It should be noted that any combination of wired instructions, for example as discussed with reference to FIG. 3, and wireless instructions, for example as discussed with reference to FIGS. 5A-C, may be implements to perform algorithm 200 in accordance with aspects of the present disclosure.

As more media devices can be attached to the television to display contents, people daily activities are more involved in watching television. When playing primary content on the television, it is important to identify important content to immediately display on the television to notify the user. However, it is more important to be able to switch the television operation back to primary content mode to enhance the user's television watching experience. With today's technology, there are certain media devices available that can switch the television operation to display important content mode on a secondary media input, but the task of switch the television operation back to display primary media content on the primary media input is not always successful. This issue decreases the user's television watching experience and causes the user to manually switch the television operation back to the primary content mode on the primary media input.

Thus, a system and method in accordance with aspects of the present disclosure ensures that the television switches back to display primary content mode after finishing displaying important content on a secondary media input.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A media device for use with a television having a primary input and a media device input, the primary input being configured to receive primary content, the media device input being in connection with said media device and being configured to receive important content from said media device, the television being configured to operate in a primary mode so as to play the primary content as received by the primary input and to operate in an important content mode so as to play the important content as received by the media device input, said media device comprising:
- a microphone configured to record initial sound from the television while operating in the first mode at an initial time, to generate initial audio data based on the recorded initial sound, to record subsequent sound from the television at a subsequent time, and to generate subsequent audio data based on the recorded subsequent sound;
- a memory having the important content and instructions stored therein; and
- a processor configured to execute the instructions stored in said memory to cause said media device to:
  - instruct said microphone to record the initial sound;
  - store the initial audio data into said memory;
  - instruct the television to switch operation from the primary mode to the important content mode;
  - provide the important content to the television;
  - subsequently instruct the television to switch operation from the important content mode to the primary mode using a primary protocol;
  - instruct the microphone to record the subsequent sound from the television at the subsequent time;
  - determine whether the television switched operation from the important content mode to the primary mode based on the initial audio data and the subsequent audio data; and
  - automatically instruct the television to switch operation from the important content mode to the primary mode using a secondary protocol when it is determined that the television has not switched operation from the important content mode to the primary mode.

2. The media device of claim 1, wherein said processor is configured to execute instructions stored on said memory to additionally cause said media device to subsequently instruct the television to switch operation from the important content mode to the primary mode using a HDMI CEC protocol having a primary control code as the primary protocol.

3. The media device of claim 2, wherein said processor is configured to execute instructions stored on said memory to additionally cause said media device to automatically instruct the television to switch operation from the important content mode to the primary mode using a HDMI CEC protocol having a secondary control code as the secondary protocol when it is determined that the television has not switched operation from the important content mode to the primary mode.

4. The media device of claim 1, wherein said processor is configured to execute instructions stored on said memory to additionally cause said media device to determine whether the television switched operation from the important content mode to the primary mode based on a comparison of the volume of the initial audio data and volume of the subsequent audio data.

5. The media device of claim 1, for further use with a remote control device configured to remotely instruct, by way of a first remote instruction signal, the television to switch operation from the important content mode to the primary mode using the secondary protocol, said media device further comprising:
- a wireless transmitter configured to transmit a wireless signal to the remote control device, wherein said processor is configured to execute instructions stored on said memory to additionally cause said media device to automatically instruct the television to switch operation from the important content mode to the primary mode using a secondary protocol by instructing the remote control device, via the wireless signal of said wireless transmitter, to transmit the first remote instruction signal when it is determined that the television has not switched operation from the important content mode to the primary mode.

6. The media device of claim 5, for further use with the remote control device being additionally configured to remotely instruct, by way of a second remote instruction signal, the television to switch operation from the primary mode to the important content mode, and being additionally configured to remotely instruct, by way of a third remote instruction signal, the television to switch operation from the important content mode to the primary mode using the primary protocol, said media device, wherein said processor is configured to execute instructions stored on said memory to additionally cause said media device to:
- instruct the television to switch operation from the primary mode to the important content mode by instructing the remote control device, via a second wireless signal of said wireless transmitter, to transmit the second remote instruction signal; and
- subsequently instruct the television to switch operation from the important content mode to the primary mode using by instructing the remote control device, via a third wireless signal of said wireless transmitter, to transmit the third remote instruction signal.

7. A method of using a media device with a television having a primary input and a media device input, the primary input being configured to receive primary content, the media device input being in connection with the media device and being configured to receive important content from the media device, the television being configured to operate in a primary mode so as to play the primary content as received by the primary input and to operate in an important content mode so as to play the important content as received by the media device input, said method comprising:
- instructing, via a processor configured to execute instructions stored on a memory, a microphone to record an initial sound from the television while operating in the first mode at an initial time to generate initial audio data based on the recorded initial sound;
- storing, via the processor, the initial audio data into the memory;
- instructing, via the processor, the television to switch operation from the primary mode to the important content mode;
- providing, via the processor, the important content to the television;
- subsequently instructing, via the processor, the television to switch operation from the important content mode to the primary mode using a primary protocol;
- instructing, via the processor, the microphone to record a subsequent sound from the television at a subsequent time to generate subsequent audio data based on the recorded subsequent sound;
- determining, via the processor, whether the television switched operation from the important content mode to the primary mode based on the initial audio data and the subsequent audio data; and
- automatically instructing, via the processor, the television to switch operation from the important content mode to the primary mode using a secondary protocol when it is determined that the television has not switched operation from the important content mode to the primary mode.

8. The method of claim 7, wherein said subsequently instructing the television to switch operation from the important content mode to the primary mode comprises subsequently instructing the television to switch operation from the important content mode to the primary mode using a HDMI CEC protocol having a primary control code as the primary protocol.

9. The method of claim 8, wherein said automatically instructing the television to switch operation from the important content mode to the primary mode using a secondary protocol when it is determined that the television has not switched operation from the important content mode to the primary mode comprises automatically instructing the television to switch operation from the important content mode to the primary mode using a HDMI CEC protocol having a secondary control code as the secondary protocol when it is determined that the television has not switched operation from the important content mode to the primary mode.

10. The method of claim 7, wherein said determining, via the processor, whether the television switched operation from the important content mode to the primary mode based on the initial audio data and the subsequent audio data comprises determining whether the television switched operation from the important content mode to the primary mode based on a comparison of the volume of the initial audio data and volume of the subsequent audio data.

11. The method of claim 7, for further use with a remote control device configured to remotely instruct, by way of a first remote instruction signal, the television to switch operation from the important content mode to the primary mode using the secondary protocol, said method further comprising automatically instructing the television to switch operation from the important content mode to the primary mode using a secondary protocol by instructing the remote control device, via a wireless signal of a wireless transmitter configured to transmit a wireless signal, to transmit the first remote instruction signal when it is determined that the television has not switched operation from the important content mode to the primary mode.

12. The method of claim 11, for further use with the remote control device being additionally configured to remotely instruct, by way of a second remote instruction signal, the television to switch operation from the primary mode to the important content mode, and being additionally configured to remotely instruct, by way of a third remote instruction signal, the television to switch operation from the important content mode to the primary mode using the primary protocol, said method further comprising:
  instructing, via a second wireless signal of the wireless transmitter, the television to switch operation from the primary mode to the important content mode by instructing the remote control device to transmit the second remote instruction signal; and
  subsequently instructing, via a third wireless signal of the wireless transmitter, the television to switch operation from the important content mode to the primary mode by instructing the remote control device to transmit the third remote instruction signal.

13. A non-transitory, computer-readable media having computer-readable instructions stored thereon, the computer-readable instructions being capable of being read by a media device for use with a television having a primary input and a media device input, the primary input being configured to receive primary content, the media device input being in connection with said media device and being configured to receive important content from said media device, the television being configured to operate in a primary mode so as to play the primary content as received by the primary input and to operate in an important content mode so as to play the important content as received by the media device input, wherein the computer-readable instructions are capable of instructing the media device to perform the method comprising:
  instructing, via a processor configured to execute instructions stored on a memory, a microphone to record an initial sound from the television while operating in the first mode at an initial time to generate initial audio data based on the recorded initial sound;
  storing, via the processor, the initial audio data into the memory;
  instructing, via the processor, the television to switch operation from the primary mode to the important content mode;
  providing, via the processor, the important content to the television;
  subsequently instructing, via the processor, the television to switch operation from the important content mode to the primary mode using a primary protocol;
  instructing, via the processor, the microphone to record a subsequent sound from the television at a subsequent time to generate subsequent audio data based on the recorded subsequent sound;
  determining, via the processor, whether the television switched operation from the important content mode to the primary mode based on the initial audio data and the subsequent audio data; and
  automatically instructing, via the processor, the television to switch operation from the important content mode to the primary mode using a secondary protocol when it is determined that the television has not switched operation from the important content mode to the primary mode.

14. The non-transitory, computer-readable media claim 13, wherein the computer-readable instructions are capable of instructing the media device to perform the method wherein said subsequently instructing the television to switch operation from the important content mode to the primary mode comprises subsequently instructing the television to switch operation from the important content mode to the primary mode using a HDMI CEC protocol having a primary control code as the primary protocol.

15. The non-transitory, computer-readable media claim 14, wherein the computer-readable instructions are capable of instructing the media device to perform the method wherein said automatically instructing the television to switch operation from the important content mode to the primary mode using a secondary protocol when it is determined that the television has not switched operation from the important content mode to the primary mode comprises automatically instructing the television to switch operation from the important content mode to the primary mode using a HDMI CEC protocol having a secondary control code as the secondary protocol when it is determined that the television has not switched operation from the important content mode to the primary mode.

16. The non-transitory, computer-readable media claim 13, wherein the computer-readable instructions are capable of instructing the media device to perform the method wherein said determining, via the processor, whether the television switched operation from the important content mode to the primary mode based on the initial audio data and the subsequent audio data comprises determining whether the television switched operation from the important content mode to the primary mode based on a comparison of the volume of the initial audio data and volume of the subsequent audio data.

17. The non-transitory, computer-readable media claim 13, for further use with a remote control device configured to remotely instruct, by way of a first remote instruction signal, the television to switch operation from the important content mode to the primary mode using the secondary protocol, wherein the computer-readable instructions are capable of instructing the media device to perform the method, further comprising automatically instructing the television to switch operation from the important content mode to the primary mode using a secondary protocol by instructing the remote control device, via a wireless signal of a wireless transmitter configured to transmit a wireless signal, to transmit the first remote instruction signal when it is determined that the television has not switched operation from the important content mode to the primary mode.

18. The non-transitory, computer-readable media claim 17, for further use with the remote control device being additionally configured to remotely instruct, by way of a second remote instruction signal, the television to switch operation from the primary mode to the important content mode, and being additionally configured to remotely instruct, by way of a third remote instruction signal, the television to switch operation from the important content mode to the primary mode using the primary protocol, wherein the computer-readable instructions are capable of instructing the media device to perform the method, further comprising:
    instructing, via a second wireless signal of the wireless transmitter, the television to switch operation from the primary mode to the important content mode by instructing the remote control device to transmit the second remote instruction signal; and
    subsequently instructing, via a third wireless signal of the wireless transmitter, the television to switch operation from the important content mode to the primary mode by instructing the remote control device to transmit the third remote instruction signal.

\* \* \* \* \*